United States Patent Office 3,354,886
Patented Nov. 28, 1967

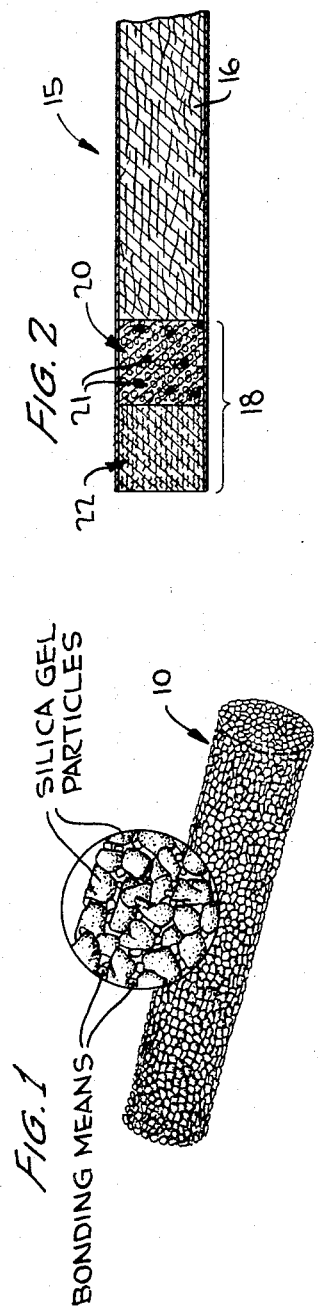
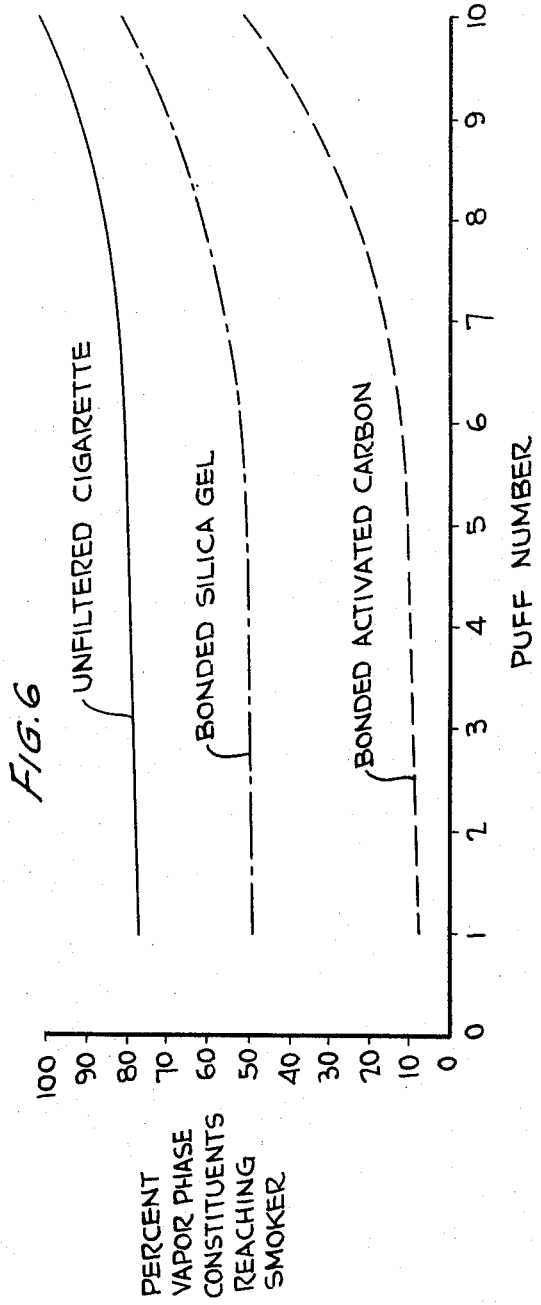

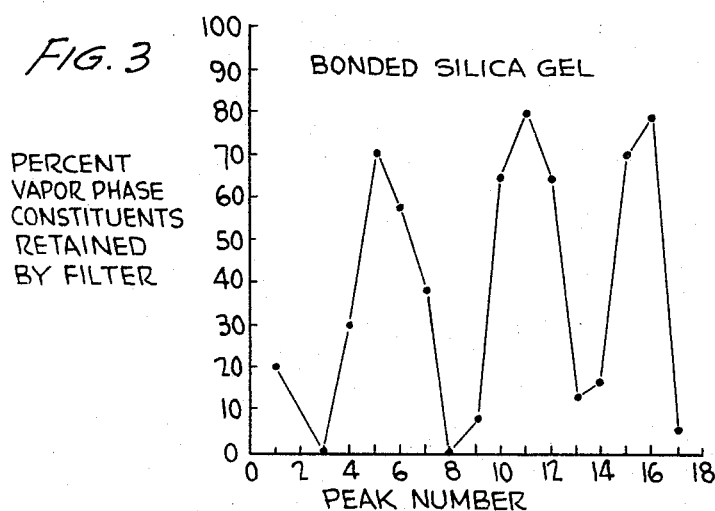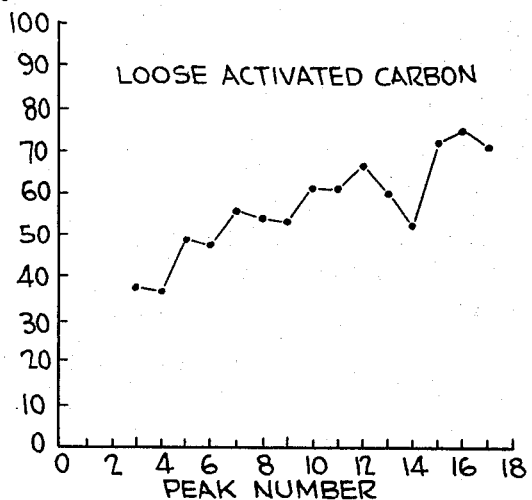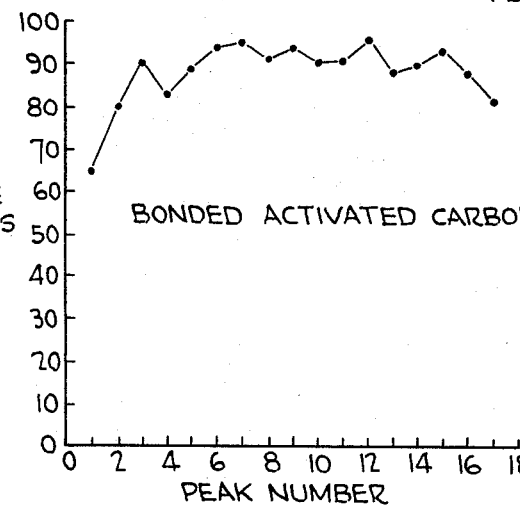

3,354,886
BONDED SILICA GEL PRODUCTS
Richard M. Berger and Reavis C. Sproull, Richmond, Va., assignors to American Filtrona Corporation, a corporation of New York
Filed Apr. 29, 1966, Ser. No. 546,315
The portion of the term of the patent subsequent to Nov. 16, 1982, has been disclaimed
11 Claims. (Cl. 131—10.9)

ABSTRACT OF THE DISCLOSURE

Bonded silica gel products in the form of a continuous porous matrix with particular utility as desiccants and as smoke filter elements. The bonded nature of the silica gel product for use as a desiccant facilitates handling of the same. The bonded nature of the silica gel product provides unique filtering properties for use in filtered cigarettes and the like. The filtration properties of the silica gel in such products are not significantly diminished by absorption of environmental moisture. Additionally, bonded silica gel filter plugs are shown to provide selective filtration in contrast to "blanket" filtration such as results from a bonded carbon filter plug. The taste characteristics of smoke passed through a bonded silica gel filter element are particularly uniform throughout the entire smoking operation. Combination of a bonded silica gel filter plug with a cellulose acetate tow or paper-type filter which is particularly active to solid constituents, results in a "balanced" filtration removing approximately 50 percent of both the gas and solid phase constituents.

---

This application is a continuation-in-part of application Serial No. 351,162, filed Mar. 11, 1964, and entitled Process of Making Stable Elongated Bodies, which in turn is a continuation-in-part of applications Ser. Nos. 306,343 and 343,463, filed Sept. 3, 1963 and Feb. 10, 1964, respectively, both entitled Smoke Filter, and both now abandoned.

The aforesaid application is directed to a procedure for the manufacture of stable, elongated, "bonded" elements from particulate materials, these elements having particular utility as smoke filters and the like.

The term "bonded" as used herein shall be understood to refer to a substantially self-sustaining body in the form of a continuous porous matrix wherein the particulate material is provided with structural continuity by a multiplicity of bonding means or bridges.

The preferred material set forth in the aforesaid parent application is activated carbon, although it is indicated that other particulate materials including silica gel can be substituted for the activated carbon in the manufacturing process.

This invention relates to the provision of bonded silica gel products which may be used in various manners and relates more particularly to such products having particular utility as desiccants and as smoke filter elements.

Silica gel is a material which is extremely well known for its hygroscopic properties. Heretofore, loose particles of silica gel have been packaged in permeable plastic bags or the like whereby they have served to remove moisture from the environment, particularly in the storage of chemicals or pharmaceuticals which must be maintained in a dry atmosphere. The fact that such loose particles have required special packaging heretofore has rendered their use inconvenient and somewhat costly. Moreover, in such loose form they take up an undue amount of space. Therefore, one of the basic objectives of the instant invention is the provision of a bonded silica gel element wherein the particles are united into a stable, extremely compact form without significantly reducing their desiccating properties.

In addition to the use of silica gel as a desiccant, there has been some suggestion heretofore directed to the use of this material in a smoke filter. However, the extremely high degree of hygroscopicity of this material has been found to limit its usefulness in previous attempts to incorporate such material into cigarette filters and the like. Prior art techniques for utilizing silica gel in such smoke filters have only been able to incorporate relatively small quantities of this material in the overall filter structure. The fact that silica gel will absorb moisture from the environment almost immediately has been found with such prior art constructions to render the silica gel substantially inactive whereby the inclusion of silica gel has been impractical from a commercial standpoint. For example, adding silica gel particles to paper or tow cigarette filters capable of carrying relatively small quantities of such sorbent materials has resulted in a filtration efficiency insignificantly different from the paper or tow per se due to the saturation of the silica gel, even during the manufacturing procedure, from the moisture in the surrounding environment. Therefore, the concept of incorporating this material into cigarette filters has been generally abandoned by the industry insofar as the techniques suggested heretofore are concerned since little or no significant increase in filtration efficiency was provided thereby.

Surprisingly, it has now been found that if a bonded element is formed wherein silica gel can be present in extremely large quantities, e.g., from approximately 25 to as much as 95 percent by weight of the overall structure, preferably in excess of 50 weight percent, the filtration properties of the silica gel are not significantly diminshed from a commercial standpoint, by adsorption of environmental moisture as has been the case with prior art constructions. Therefore, the provision of a bonded silica gel filter plug is of great commercial significance since, in this form, the silica gel particles have a utility which they lacked in earlier arrangements which permitted the presence of only a relatively small quantity of such material in the overall filter element.

Perhaps an even more significant and unexpected phenomenon is the difference in the type of filtration obtained with a bonded silica gel plug as compared with a bonded activated carbon filter element such as set forth in our earlier Patent No. 3,217,715. Activated carbon provides what may be termed a "blanket" filtration of the smoke constituents, i.e., a relatively high filtration of substantially all the constituents to an almost equal degree. In contrast, bonded silica gel elements in accordance with the instant invention provide a marked selectivity in the smoke constituents which are removed during use. First of all, it has now been found that bonded silica gel filter elements are primarily active to remove selected gaseous or vapor phase constituents from the smoke. A bonded carbon plug, in contrast, removes substantially all vapor phase constituents to an almost equal degree. Further, although the bonded silica gel and carbon plugs exhibit approximately the same low-volatile component filtration efficiencies, a silica gel plug removes less of the semi-volatile components than a carbon plug.

There are a number of advantages provided by the selective activity of the bonded silica gel elements of this invention. In the first place, it must be recognized that many of the constituents removed by filtration of smoke are the organoleptic or taste-producing materials which at least a certain portion of the public prefer to have present in the smoke. In some instances, there is objection to a "blanket" filtration because of the high degree of removal of such materials from the smoke. In contrast, with the use of the bonded silica gel element of the instant invention, although filtration is relatively efficient when compared to many of the more conventional forms of filter plugs currently in use, sufficient passage of some of the constituents of the smoke is permitted to provide a different taste from a carbon-filtered smoke, which to a certain portion of the smoking public will be preferred.

A still further advantage realized with the use of a bonded silica gel element in accordance with this invention as a filter plug results from what may be termed a relatively "flat filtration curve," i.e., a relatively constant level of filtration which is not subject to a sharp or rapid desorption evident at about the eighth puff of a cigarette utilizing other filter elements. In other words, it has been unexpectedly found that bonded silica gel filter plugs do not become saturated relatively suddenly toward the end of the smoking of a cigarette or the like incorporating such elements whereby the efficiency would be sharply reduced and the resultant smoke passing therethrough would have a substantially different flavor. With the use of a bonded silica gel element the taste characteristics of the smoke are much more uniform throughout the entire smoking operation than has been possible with prior art constructions.

This uniformity of taste is further enhanced by the use of a bonded silica gel filter element in accordance with this invention in combination with a filter element which is primarily activated to remove solid phase constituents from smoke passing through the same. Cellulose acetate tow plugs which are conventionally used in "dual filter" cigarettes are known to be active primarily to remove approximately 40–50 percent of the solid or particulate phase constituents from the cigarette smoke passing therethrough, but are substantially inactive toward the gaseous or vapor phase constituents of the smoke. The bonded silica gel filter elements of this invention, on the other hand, have a relatively low filtration activity toward the solid phase constituents, but on the average, can be said to remove approximately 50 percent of the gaseous phase constituents from the smoke. Thus, when a dual filter is provided utilizing an element according to this invention in combination with a cellulose acetate tow or paper-type filter such as is conventional in the prior art, a "balanced" filtration will result whereby in the vicinity of approximately 50 percent of both the gas and solid phase constituents are removed during the smoking operation. Such a relationship is particularly satisfactory from an overall commercial viewpoint.

Thus, in addition to the concept of providing a bonded silica gel element which can be utilized for its desiccating properties, it is another basic objective of this invention to provide such an element which is useful as a smoke filter, particularly in combination with cigarettes or other such smoking devices as cigars, pipes and the like.

Further, in view of the explanation above, it is an important objective of the present invention to provide a smoke filter which is selectively active to primarily remove certain of the gaseous or vapor phase constituents of the smoke without substantially impairing the desirable taste characteristics. In this same vein, and as pointed out previously, a basic objective of this invention is the provision of a smoke filtering means having balanced and substantially uniform filtration properties throughout the use of the same.

Consistent with the foregoing, the instant invention has the objective in general of providing a stable, self-supporting, porous element wherein silica gel particles form the predominant structural component of the body and wherein the structural continuity of the element is derived basically from the silica gel particles and a bonding agent therefor, the bonding agent preferably being one of the presently commercially available, comparatively inexpensive, thermoplastic materials such as the polyhydrocarbons, more particularly, polyethylene or polypropylene.

Aside from the more basic objects set forth hereinabove, the instant invention contemplates certain additional, more specific, objectives including (1) the provision of a stable, self-supporting, porous body primarily formed of silica gel particles, but incorporating various additive materials in minor part by weight and volume in order to decrease the costs or modify the functional and structural characteristics of the product without substantially departing from the basic concept; (2) the provision of such a bonded silica gel element wherein the density, the pressure-drop and certain of the other properties can be varied within relatively wide limits depending upon the ultimate use of the product; (3) the provision of a stable element which has good handling properties, which does not require special packaging when used as a desiccant and which can be made under high production techniques so as to be available for widespread use at relatively low cost; and (4) the provision of a form of silica gel-containing filter element which maintains its selective filtration properties even when saturated with water vapor at the level of humidity existing in a combined filter tip cigarette.

Other and further objects of the instant invention reside in the specific combinations of materials and quantitative ranges set forth as well as the particular structural and functional characteristics of the bonded silica gel product defined hereinafter.

Still other objects will in part be obvious and in part be pointed out as the description of the invention proceeds and as shown in the accompanying drawings wherein:

FIGURE 1 is a perspective view of a bonded silica gel rod in accordance with the instant invention, a portion of the same being magnified to show the details of the construction;

FIGURE 2 is a longitudinal cross-sectional view through a preferred form of a cigarette incorporating a bonded silica gel plug in accordance with this invention as a portion of its filter means;

FIGURE 3 is a graph showing the retention properties of a bonded silica gel element in accordance with this invention for various constituents in the vapor phase of cigarette smoke;

FIGURE 4 is a graph similar to FIGURE 3 but showing the retention properties of a bonded activated carbon element for the same constituents;

FIGURE 5 is a another similar graph showing the retention properties of a filter element comprised of loose activated carbon particles; and FIGURE 6 is a graph comparing the puff-by-puff activity of an unfiltered cigarette and a cigarette having a bonded activated carbon filtering means with a cigarette having a bonded silica gel filtering means in accordance with this invention.

Referring to FIGURE 1, a bonded silica gel rod is illustrated generally at 10 and as will be seen in the magnified portion thereof, the rod consists essentially of silica gel particles cooperating with bonding means to provide structural continuity in the form of a self-sustaining, substantially particulate, porous stable body. The rod 10 can be used in the form shown in FIGURE 1 or cut into individual smaller elements, depending upon the function the product is to serve. Regardless of the shape, the rod is particularly useful as a bonded desiccant whereby any portion of the same may be packaged with a chemical or pharmaceutical material in order to maintain the environment to which the material is subjected substantially dry. For maximum desiccating properties, the bonded silica gel rods should be reactivated after manufacturing by drying the same in an oven to remove absorbed moisture whereby the silica gel particles in such bonded form will have desiccating properties substantially equivalent to the loose silica gel particles from which the rod is formed. However, the handling of the bonded product is substantially simplified in that the desiccant need not be separately packaged prior to use. Moreover, the compact nature of the bonded rod provides substantial space saving advantages when compared to conventional loose silica gel particles.

As mentioned, the rod 10 shown in FIGURE 1 may be subdivided into a plurality of individual segments, and such procedure will provide elongated plugs useful as a filtering means, preferably as a smoke filter for cigarettes, cigars, pipes and the like. Referring now to FIGURE 2, a dual filter cigarette is illustrated generally at 15 and will be seen to comprise a tobacco section 16 and a filter section 18 which includes a bonded silica gel plug 20 in accordance with this invention as a part thereof. While the plug 20 preferably consists of silica gel and binder alone, it may include a small amount of an additive material illustratively shown at 21 as will be explained in more detail hereinafter. It is to be understood that although the plug 20 is shown in a dual filter cigarette, if desired, such plug will have separate utility as the entire filter means for a cigarette or other smoking device, and, additionally, such filter plug may form part of a triple filter or other such modified filtering means. However, the preferred use of a bonded silica gel plug in a cigarette filter section according to this invention contemplates interposing such plug between the tobacco section 16 and an additional filter element 22 which is primarily active to remove solid or particulate phase constituents from smoke passing through the same. The additional filter element 22 preferably takes the form of a conventional cellulose acetate tow filter, but paper filters or filter elements having various additives therein are also within the the scope of the instant inventive concept. By utilizing an additional filter element which is primarily active to remove solid phase constituents from the smoke, balanced filtration will be obtained due to the cooperation between the removal of solid phase constituents effected by the additional filter element and the selective removal of gaseous phase constituents effected by the bonded silica gel plug. Thus, this combination of filter elements provides a unique correlation of functional properties which allows the smoker to receive satisfactory taste properties by balancing the vapor and solid phase constituents passing therethrough.

The selective nature of the vapor phase filtration of the bonded silica gel product of this invention can be graphically seen from the retention patterns, that is, the percent of particular vapor phase constituents retained by the filter, shown in FIGURES 3–5 wherein the bonded silica gel plug is compared with a bonded activated carbon plug and loose activated carbon particles. The peak numbers on the graphs of FIGURES 3–5 correspond to the vapor phase constituents listed in Table 1 below:

TABLE 1

| Peak number: | Constituent |
|---|---|
| 1 | Acetaldehyde. |
| 2 | Isoprene. |
| 3 | Methyl formate. |
| 4 | Furan. |
| 5 | Acetone. |
| 6 | Acrolein. |
| 7 | Methyl acetate. |
| 8 | Methanol. |
| 9 | Methyl furan. |
| 10 | Methyl ethyl ketone. |
| 11 | Acetonitrile. |
| 12 | Diacetyl. |
| 13 | Benzene. |
| 14 | Dimethyl furan. |
| 15 | Diethyl ketone. |
| 16 | Crotonaldehyde. |
| 17 | Toluene. |

By reference to FIGURE 3, it will be seen that the bonded silica gel filter shows a very marked selectivity, particularly when compared to the bonded activated carbon filter shown in FIGURE 4. In the FIGURE 4 graph an extremely high, relatively uniform filtration will be seen to exist for substantially all of the constituents of the vapor phase, this type of filtration having been referred to earlier as "blanket" filtration.

The FIGURE 5 graph shows the retention pattern for a filter cigarette of the type wherein loose activated carbon particles are disposed between a pair of tow-type segments and it will be noted that this form of filter means provides a retention pattern of the same general type as is present with a bonded activated carbon plug, but at a somewhat lower level.

Another interesting property of the bonded silica gel element of this invention when used as a cigarette filter or the like will be seen in FIGURE 6 in a comparison of the puff-by-puff activity of a cigarette containing such filter element with an unfiltered cigarette and also with a cigarette containing a bonded activated carbon filter element. The percent of vapor phase constituents which reach the smoker in an unfiltered cigarette will be seen to increase over the ordinary 10-puff life of the cigarette from approximately 80 to substantially 100 percent. In other words, when an unfiltered cigarette is first lit, the tobacco itself functions to filter a portion of the constituents, but by the time the cigarette is smoked down to the end, the unfiltered cigarette performs almost no filtration. On the other hand, a cigarette having a highly active bonded carbon filter element removes almost 95% of the constituents at the beginning of the smoke, but drops rapidly at about the eighth puff at which point the carbon particles suddenly begin to loose their activity. In contrast, the bonded silica gel filter of this invention begins at approximately an average of 50 percent removal of vapor phase constituents from the smoke and tapers slowly over the puff life of the cigarette with no rapid deactivation at the eighth puff, but rather with a more gradual reduction in filtration efficiency over the life of the cigarette to produce a flatter filtration or one which is more uniform throughout the smoking operation.

In accordance with the instant invention silica gel particles are integrally mixed with a bonding agent and the mixture is formed into a stable filter structure preferably in accordance with the procedures set forth in the aforementioned parent application, Ser. No. 351,162.

Various bonding agents are disclosed in the said parent application and any of such materials are within the scope of the instant inventive concept, but preferably, the bonding agent comprises a thermoplastic material such as the polyhydrocarbons having from 2 to 10 carbon atoms, particularly the polyolefins, e.g., polyethylene and polypropylene. Other thermoplastics such as vinyl acetate, other vinyl homopolymers and copolymers, plasticized cellulose acetate, Artrite (a thermoplastic polyester resin), Escorex (a fine powdered petroleum hydrocarbon resin) and combinations of any of the above are useful, all of these materials being of type which are effective to provide bonding at temperatures in excess of that of the normal smoke temperature passing through a cigarette plug. Of course, for use such as a desiccant, the melting point of the bonding material will not be as significant since the product will not be subjected to elevated temperatures.

In any event, the best results are obtained when the bonding agent is a polyolefin, or more specifically, polyethylene, polypropylene or combinations thereof.

Various forms of bonding agents such as disclosed in the parent application can be utilized, but preferably silica gel particles are intimately mixed with bonding agent particles which are of a size no greater than equal to, and preferably substantially less than, the particle size of the silica gel particles. Preferably, the silica gel particles have a size of between about 6 and 200 mesh and the binder has a particle size of less than 100, preferably less than 50 microns. For use as a cigarette filter element, the silica gel particles are preferably maintained between about 6 and 100, more particularly between 6 and 42 mesh, although particle sizes of between 28 and 200 mesh have been successfully utilized in preparing a bonded silica gel desiccant rod.

The mixing is carried out in any suitable manner with the silica gel particles present in a relative amount of between 25 and 95 percent by weight, preferably in excess of 50 or even 70 or 85 to 93½ percent by weight, and the bonding agent is present in a relative amount of between 5 and 50 percent by weight, preferably 6½ to 30 and more specifically, 9 to 11, percent by weight. After the silica gel and bonding agent is integrally mixed, the mixture is formed into a stable rod-like structure with heat or the like being applied to soften or activate the bonding agent whereby it adheres to the adjacent silica gel particles and serves as a binder therebetween, this procedure inherently resulting in the the formation of a multiplicity of bonding bridges predominantly individually smaller than the silica gel particles themselves.

It may be desirable for various reasons to incorporate an additive in the bonded silica gel structure, particularly if the product is to be utilized in a cigarette filter. For example, limited quantities of activated carbon can be incorporated up to approximately 30 percent by weight and volume beyond which point the blanket filtration of the activated carbon type of structure will become evident and will overshadow the selective filtration of the silica gel construction. Further, where density characteristics are important, natural or synthetic fibers may form a part of the bonded silica gel structure. Alternately, puffed and/or comminuted tobacco stocks and stems may be included with alkalies and acid modifiers which chemically stabilize the ultimate unit. Where porosity and even strength properties are of major consideration, then metal fibers can be included as a portion of the bonded structure. Further, the filler material can comprise fibrous carbon as, for example, where porosity is of particular significance. Also, Orzan, a sulfonate polymer possessing good dispersing and chelating properties have been found to be a suitable additive from the standpoint of hardness and sorptivity. Sucrose (table sugar) and methyl cellulose serve as suitable additives to improve hardness and sorptivity and Delvex, N-vinyl-5-methyl-2-oxazolidinone is a useful additive because of its film forming and chelating properties and when used, the resultant structure has improved uniformity as well as good sorptivity and hardness.

While it is known that various constituents of tobacco smoke are harmful, it is not known with any degree of certainty which are the most harmful. It is believed that certain additives eliminate some of these constituents and it is therefore within the scope of this invention to add a minor amount of an additive to enhance the operating or taste characteristics of the filter unit. Accordingly, it has been found that certain natural and synthetic resins as well as certain inorganic materials can be employed for control purposes. Examples of control additives include powdered resins which may permit use of less bonding agent as well as otherwise modifying the properties of the resultant structure. Such resins include polyethylene, polypropylene, polyvinyl acetate, polycarbonates, polyamides of the nylon type, for example, nylon 6, nylon 6/6 and nylon 6/10, modified cellulose resins, for example, cellulose acetate, and dimethyl cellulose, powdered natural gums, carbonates, for example, the various sugars, powdered calcium carbonate and fiberized wood pulp.

Other additives can include alkali metal aluminosilicates, such as molecular sieves sold by Linde Company, a division of Union Carbide Corporation, activated alumina, volcanic ash, granular sodium carbonate, fuller's earth, magnesium silicates, asbestos powder, metallic oxides such as iron oxide and aluminum oxide, metal treated carbon and the like. Moreover, such taste modifiers as menthol or other similar materials may be incorporated for obvious reasons.

Preferably the additive material is in particulate or finely divided form or even in liquid form such as menthol whereby individual portions of the additive material have a maximum dimension which is a small fraction of the minimum dimension of the final structure.

It should be understood from the preceding paragraph that the term "filler material" or "additive" as used herein, refers to a material other than those which provide the basic structural components of the ultimate smoke filter constructed in accordance herewith. Silica gel particles and the bonding agent or binder are the basic structural materials and the additive is auxiliary thereto. Preferably, the additive material is present in less than 30 percent by weight and volume of the final structure.

Those skilled in the art will recognize that many of the above additive materials are basically non-reactive diluents, but the additive material is not necessarily an inactive constituent of the filter. It will be understood from the known properties of the above materials that the additive may modify the filter structure, as for example, those chemicals or chemical compounds yielding desirable taste properties or the like. From the rather extensive list set forth previously, it will be understood that these materials are merely exemplary and the list is not intended to be all inclusive. Moreover, it is to be understood that while the various additives have been set forth individually above, such materials may be utilized in various combinations.

If a filler material or additive is utilized, then preferably the same is integrally mixed with the basic structural materials during the initial mixing·operation referred to above. However, it is within the scope of the instant invention to treat a structure formed in accordance herewith with additives or the like after its formation into a stable structure.

Regardless of the manner in which a filler material or additive is incorporated in the ultimate unit, whether the same be singly or in combination, it is to be emphasized that the additive material will provide only a minor part of the functional characteristics of the final structure, the silica gel particles being the major active material in all instances. Of course, various non-reactive additives such as those listed above may be utilized to reduce the costs of the final product if the particular use to which such product is to be put will permit such dilution of functional efficiency. Accordingly, the weight ranges set forth above for the basic structural materials, namely, the silica gel particles and the bonding agent are applicable even in cases where filler materials and additives are utilized.

Although the preferred procedure for forming bonded silica gel products in accordance with this invention will be found in the aforesaid parent application, Ser. No. 351,162, other procedures for the manufacture of a bonded product will be found in our earlier Patent No. 3,217,715.

The following examples illustrate the manner in which the products hereof can be provided and efficiently utilized.

EXAMPLE I

A mixture of silica gel particles passing a 28 mesh screen and retained on a 200 mesh screen was made with polyethylene particles of approximately 50 microns and less. The mixture was fed into a porous belt which was utilized to form the mixture into a substantially cylindrical, continuous rod-like shape. Steam was passed through the porous belt at a temperature of from about 250 to 300° F. and at a rate of about 10 pounds per hour in a manner similar to the process set forth in parent application S.N. 351,162. Subsequently, air was passed through the belt at a rate of approximately 10 cubic feet per minute to cool and set the rod in its stable configuration.

Various ranges of the two materials from 25 weight percent silica gel to 95 weight percent silica gel provide satisfactory bonding characteristics and the resultant product has excellent desiccating properties and good handling characteristics.

EXAMPLE II

Silica gel particles between 6 and 42 mesh were intermixed with a binder such as in the previous example and a bonded product formed therewith. Similar quantitative ratios were utilized with satisfactory bonding characteristics, although preferred functional characteristics are noted when the silica gel is present in excess of 50 percent by weight and the optimum range is from 70 to 93½ percent silica gel particles and from 6½ to 30 percent binder, more preferably 9 to 11 percent binder.

Subdivision into approximately 10 millimeter segments of a rod formed according to the process set forth in Example II produces plugs useful as cigarette filter elements and having satisfactory density and pressure drop characteristics which can be varied by modifying the quantities of the individual components utilized. Similarly, the retention of specific smoke constituents can be selectively adjusted by varying the quantitive ratio of the materials within the plug.

EXAMPLE III

Addition of various additives and mixtures of filler materials, preferably up to approximately 30 percent by weight and volume does not significantly affect the basic characteristics of the bonded silica gel product.

For example, a product comprising 55 percent by weight silica gel, 30 percent activated carbon and 15 percent polypropylene particles provides a filter wherein the blanket filtration of the activated carbon does not overshadow the selective filtration of the silica gel which remains the major active component of the product.

Likewise, a bonded rod comprising 30 percent by weight silica gel particles, 30 percent of a non-reactive diluent such as powdered nylon 6 and 40 percent polyethylene particles functions as an inexpensive, but still relatively efficient desiccating means.

It appears unnecessary to give further examples in the specification since the invention can be more than adequately understood from the preceding discussion and even from the first example given.

Since many embodiments may be made of the instant inventive concepts and since many modifications may be made of the embodiments hereinbefore shown and described, it is to be understood that all matter herein is to be interpreted merely as illustrative and not in a limiting sense. Accordingly,

What is claimed is:

1. A stable, self-supporting, elongated rod consisting essentially of constituents selected from the group consisting of:
   (a) from approximately 25 to approximately 95 percent by weight of silica gel particles, the individual particles having a maximum dimension which is a small fraction of the minimum dimension of said rods;
   (b) from at least 5 to approximately 50 percent by weight of a thermoplastic resin, said thermoplastic resin being operative essentially alone to effect bonding bridges between juxtaposed constituents through heating and subsequent cooling; and
   (c) an additive material having a maximum dimension which is a small fraction of the minimum dimension of said rods;
said rod further being characterized by:
   (1) said silica gel particles serving as the major active component of said rod;
   (2) said thermoplastic resin essentially alone serving as a binder between said constituents and defining a multiplicity of discrete bonding means predominantly individually smaller than said silica gel particles;
   (3) said constituents cooperating through said bonding means to give structural continuity to said rod as a self-sustaining, substantially particulate stable body in the form of a continuous porous matrix;
   (4) said constituents being comingled in any cross-section of said body and with said silica gel particles randomly arranged in said rod such that a multiplicity of said silica gel particles are present in substantially any cross-section of said body; and
   (5) said body deriving its stability substantially only from said cooperation between said bonding means and said constituents.

2. A stable, self-supporting smoke filter means comprising an elongated plug consisting essentially of the following constituents:
   (a) from in excess of 50 to approximately 95 percent by weight of silica gel particles, said silica gel particles having a maximum dimension which is a small fraction of the minimum dimension of said plug; and
   (b) from at least 5 to approximately 50 percent by weight of a thermoplastic resin, said thermoplastic resin being operative essentially alone to effect bonding bridges between juxtaposed constituents through heating and subsequent cooling, with the temperature of the resin at which the bonding is effective exceeding that of the normal temperatures of smoke passing through said plug;
said plug further being characterized by:
   (1) said silica gel particles serving as the major active component of said plug and being primarily active to remove selected gaseous phase constituents from smoke passing through said plug during utilization of a smoking means incorporating said plug in its filter means;
   (2) said thermoplastic resin essentially alone serving as a binder between said constituents and defining a multiplicity of discrete bonding means predominantly individually smaller than said silica gel particles;
   (3) said constituents cooperating through said bonding means to give structural continuity to said plug as a self-sustaining, substantially particulate stable body in the form of a continuous porous matrix with the discrete bonding means and constituents providing a labyrinth of smoke passages therethrough;
   (4) said constituents being comingled in any cross-section of said body and with said silica gel particles randomly arranged in said plug such that a multiplicity of said silica gel particles are present in substantially any cross-section of said body; and
   (5) said body deriving its stability substantially only from said cooperation between said bonding means and said constituents.

3. The improvement according to claim 2 wherein said constituents further include up to 30 percent by weight and volume of an additive material.

4. The improvement according to claim 2 wherein said thermoplastic resin is polyethylene.

5. The improvement according to claim 2 wherein said silica gel particles are present in said plug in a relative amount of between about 93½ percent and 70 percent by weight and said thermoplastic resin is present in said plug in a relative amount of between about 6½ percent and 30 percent by weight.

6. In a smoking means of the type wherein a quantity of tobacco is ignited and smoke is drawn therefrom by a smoker, the improvement which comprises a filter means interposed between the smoker and the tobacco, said filter means comprising an elongated plug disposed in said smoking means such that smoke passes therethrough to reach the smoker, said plug consisting essentially of the following constituents:
   (a) from in excess of 50 to approximately 95 percent by weight of silica gel particles, said silica gel particles having a maximum dimension which is a small fraction of the minimum dimension of the said plug; and (b) from at least 5 to approximately 50 percent by weight of a thermoplastic resin, said thermoplastic resin being operative essentially alone to effect bonding bridges between juxtaposed constituents through heating and subsequent cooling, with the temperature of the resin at which the bonding is effective exceeding that of the normal temperatures of smoke passing through said plug;

said plug further being characterized by:

(1) said silica gel particles serving as the major active component of said plug and being primarily active to remove selected gaseous phase constituents from smoke passing through said plug during utilization of said smoking means;

(2) said thermoplastic resin essentially alone serving as a binder between said constituents and defining a multiplicity of discrete bonding means predominantly individually smaller than said silica gel particles;

(3) said constituents cooperating through said bonding means to give structural continuity to said plug as a self-sustaining, substantially particulate stable body in the form of a continuous porous matrix with said discrete bonding means and constituents providing a labyrinth of smoke passages therethrough;

(4) said constituents being comingled in any cross-section of said body and with said silica gel particles randomly arranged in said plug such that a multiplicity of said silica gel particles are present in substantially any cross-section of said body; and (5) said body deriving its stability substantially only from said cooperation between said bonding means and said constituents.

7. The improvement according to claim 6 wherein said smoking device is a cigarette comprising a tobacco section and a filter section, said filter section including said plug and an additional filter element which is primarily active to remove solid phase constituents from smoke passing through the same, said plug being interposed between said additional filter element and said tobacco section.

8. The improvement according to claim 7 wherein said additional filter element consists essentially of cellulose acetate tow.

9. The improvement according to claim 6 wherein said constituents further include up to 30 percent by weight and volume of an additive material.

10. The improvement according to claim 6 wherein said thermoplastic resin is polyethylene.

11. The improvement according to claim 6 wherein said silica gel particles are present in said plug in a relative amount of between about 93½ percent and 70 percent by weight and said thermoplastic resin is present in said plug in a relative amount of between about 6½ percent and 30 percent by weight.

References Cited

UNITED STATES PATENTS

| 2,956,329 | 10/1960 | Tovey | 131—267 X |
| 2,968,305 | 1/1961 | Barnett | 131—265 |
| 3,091,550 | 5/1963 | Doying. | |
| 3,217,715 | 11/1965 | Berger et al. | 131—264 |

FOREIGN PATENTS 406,401   3/1934   Great Britain.

SAMUEL KOREN, *Primary Examiner.*

MELVIN D. REIN, *Examiner.*